Feb. 7, 1950     E. E. BRUNNER     2,496,695
BELT COUPLING
Filed Nov. 28, 1945     3 Sheets-Sheet 1
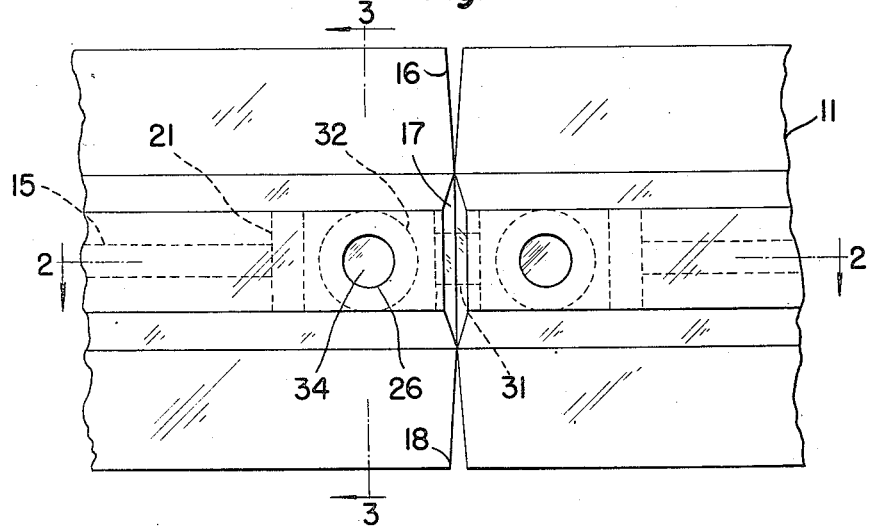
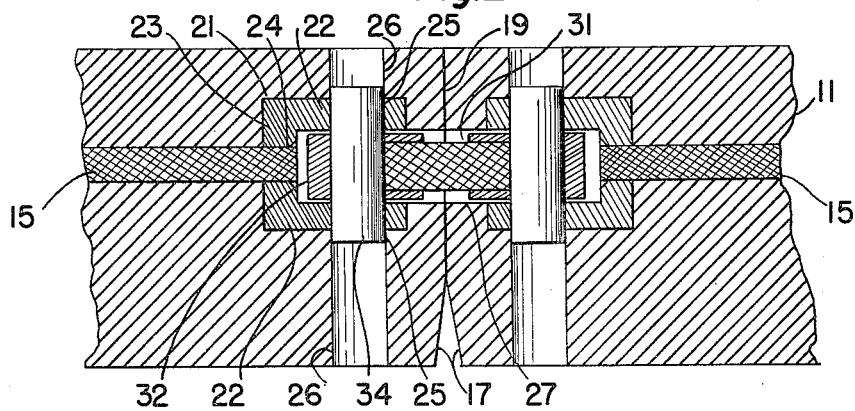
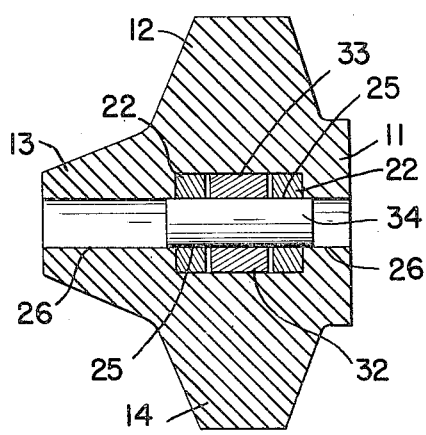
INVENTOR.
E. E. BRUNNER
BY Otto Moeller Feb. 7, 1950 E. E. BRUNNER 2,496,695
BELT COUPLING
Filed Nov. 28, 1945 3 Sheets-Sheet 2

INVENTOR.
E. E. BRUNNER
BY
Otto Moeller

Feb. 7, 1950 — E. E. BRUNNER — 2,496,695
BELT COUPLING
Filed Nov. 28, 1945 — 3 Sheets-Sheet 3
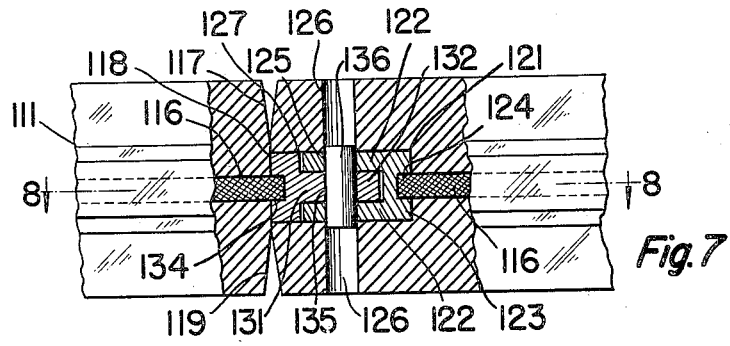
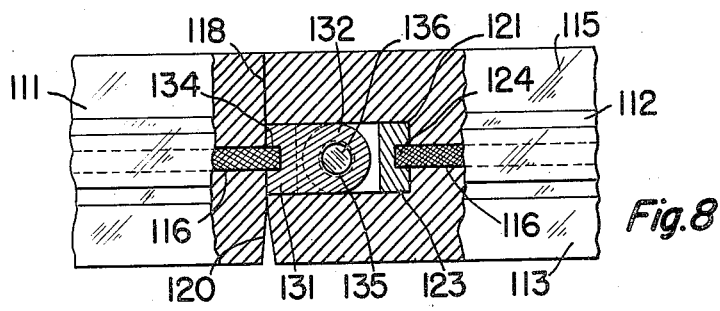
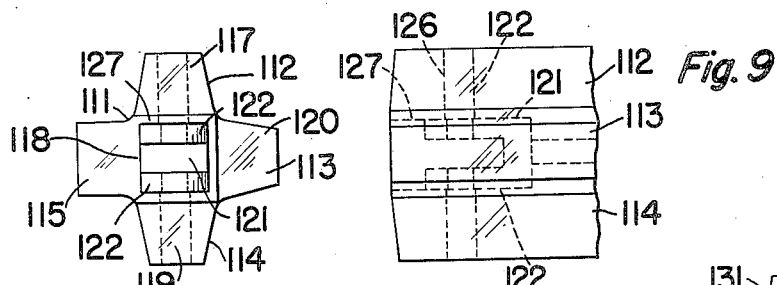
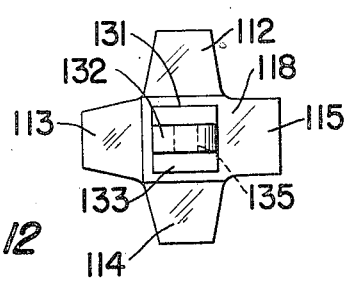
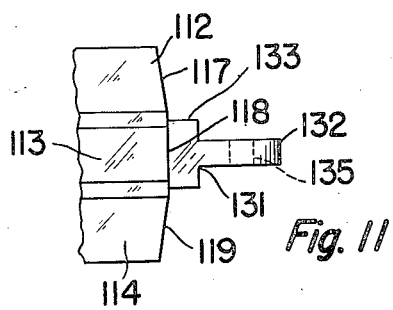
INVENTOR.
E. E. BRUNNER
BY Otto Moeller Patented Feb. 7, 1950

2,496,695

UNITED STATES PATENT OFFICE 2,496,695

BELT COUPLING

Eugene E. Brunner, York, Pa., assignor to The Standard Stoker Company, Incorporated, a corporation of Delaware Application November 28, 1945, Serial No. 631,266

9 Claims. (Cl. 24—31)

1

This invention relates to power transmitting belts and more particularly to means for connecting the adjoining ends of belts formed of flexible composition material.

An object of the invention is to provide improved means for connecting the adjoining ends of power transmitting belts, in which the connector includes a flexible coupling member arranged to permit free movement of the adjoining ends of the belt.

Another object of the invention is to provide improved means for connecting the adjoining ends of power transmitting belts, in which each end of the belt has a socket member embedded therein and disposed in the body of the belt in spaced relation to the ends thereof, and in which the socket members are arranged to receive the ends of a coupling member having a flexible section interposed between the socket members.

Another object of the invention is to provide improved means for connecting the ends of a power transmitting belt, in which one end of the belt is formed with a pocket in which is mounted a female member and the other end of the belt carries a male member arranged to be mounted within the female member and pivotally connected thereto so that the adjoining ends of the belt are free to flex when the belt passes over pulleys or sheaves.

With the foregoing and other objects and advantages in view, the invention consists in the preferred construction and arrangement of the several parts which will be hereinafter fully described and claimed.

In the accompanying drawings:

Fig. 1 is a side elevation of the adjoining ends of a power transmitting belt having a preferred form of the connecting means of the present invention;

Fig. 2 is a longitudinal section taken on the line 2—2 of Fig. 1;

Fig. 3 is a vertical transverse section taken on the line 3—3 of Fig. 1;

Fig. 7 is a side elevation, partly in longitudinal section, of the adjoining ends of a power transmitting belt having a modified form of connecting means;

2

Fig. 8 is a longitudinal section taken on the line 8—8 of Fig. 7;

Fig. 9 is a side elevation of the end of the belt having the female member;

Fig. 10 is an end view of the structure shown in Fig. 9;

Fig. 11 is a side elevation of the end of the belt having the male member; and

Fig. 12 is an end view of the structure shown in Fig. 11.

Referring to Figures 1 through 6 of the drawings showing the preferred form of the invention, the belt 11 may be formed of suitable molded material and may have a plurality of V-shaped ribs 12, 13 and 14, as shown in Fig. 3. These ribs are formed lengthwise of the belt and extend radially from the main body portion 11.

Figure 4:
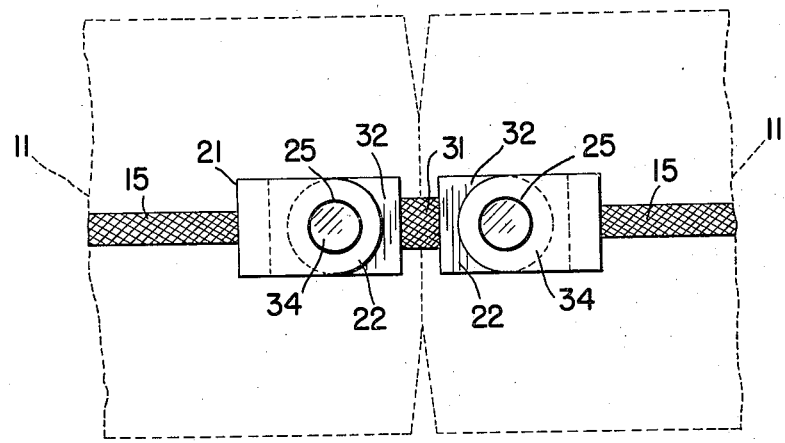
Fig. 4 is a view similar to Fig. 1 the connecting means being shown by full lines and the outline of the belt being shown by broken lines.
Figure 5:
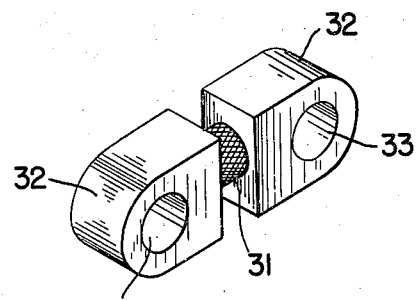
Fig. 5 is a perspective view of the coupling member.
Figure 6:
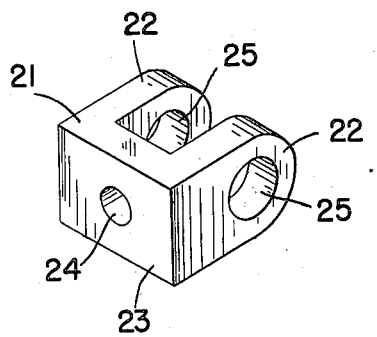
Fig. 6 is a perspective view of one of the socket members.

In order to limit to a minimum the amount of stretching of the material used in constructing the belt 11, a cable or similar element 15, can be embedded lengthwise within the main body of the molded material, as shown in Figs. 2 and 4.

The adjacent ends of the belt may be formed with a series of similar flat faces 16, 17, 18 and 19, said faces being angularly disposed with relation to each other, as shown in Figs. 1 and 2.

The arrangement of the end faces of the belt is such that when the two ends of the belt are butted together, as shown in Fig. 2, the two faces 19 will contact or abut each other, and the pair of faces 16, 17 and 18 will diverge from each other, as shown in Fig. 1. By this construction, when the joint of the belt passes over pulleys or sheaves, the belt will be free to bend or flex, the V-shaped gaps between the angularly disposed faces being closed to some extent during such bending movements.

For the purpose of connecting the two adjoining ends of the belt 11 together, suitable means are provided.

A U-shaped socket member 21 is embedded in each end of the belt. This socket member may have the form of the element shown in Fig. 6, and comprises two side legs 22 and a cross piece or bar 23 connecting the side legs and arranged at one end of the member 21.

The cross bar 23 of each socket member 21 is formed with an opening 24, in which opening is inserted an end of the cable 15. The cable may be secured to the socket member by any suitable means, such as by solder or welding the two together, so that the socket member will not become detached from the cable as the result of strains or stresses imposed thereon.

The side legs 22 of each socket member 21 are formed with alined openings 25, and similar alined openings 26 are formed in the body of the belt 11, as shown in Figs. 2 and 3.

The arrangement of each socket member 21 in each end of the belt 11 is such that the ends of the side legs 22 terminate at a distance inwardly from the face 19, and as shown in Fig. 2, the material of the belt 11 may be molded around the ends of the legs 22 so that the socket member 21 is locked or embedded within the body of the belt material.

Extending outwardly from the socket member 21 to the end face 19 of the belt and arranged between the two side legs 22, is an opening 27.

For coupling the two socket members 21 together, a connector or coupling member 31 is provided.

This connector 31 comprises a link, preferably formed of flexible material, such as a suitable length of twisted wire cable, and end portions 32 at each end for insertion between the jaws provided by the two side legs 22 of the socket members 21.

Each end portion 32 has an opening 33 formed transversely therein for registration with the alined openings 25, 26.

A pin 34 is adapted to be driven through each set of alined openings for connecting the coupling member 31 to the socket members 21, respectively. Preferably each pin 34 has a length slightly greater than the maximum width of the socket member 21, so that the ends of each pin will terminate at a distance inwardly from the outer surfaces of the belt, as shown in Figs. 2 and 3.

From the foregoing it will be noted that this invention provides a simple and flexible means for connecting the adjoining ends of a belt together. Since the intermediate portion of the coupling member 31 is formed of a flexible cable, and since the two ends of said coupling member are pivotally connected to the socket members 21 by the pin 34, the connected end portions of the belt will be as flexible as the rest of the body of the belt and the connectors will not have any tendency to stiffen this section of the belt, although being adapted to firmly and strongly hold the two ends of the belt together.

Referring to Figures 7 through 12 of the drawings showing a modified form of the invention, the belt 111 may be formed of suitable molded material and may have a plurality of V-shaped ribs 112, 113, 114 and 115, as shown in Figs. 10 and 12. These ribs are formed lengthwise of the belt and may extend radially from the main body portion 111.

In order to limit to a minimum the amount of stretching of the material used in constructing the belt 111, a cable or similar element 116, can be embedded lengthwise within the main body of the molded material, as shown in Figs. 7 and 8.

Each end of the belt may be formed with a series of flat faces 117, 118, 119 and 120, said faces being angularly disposed with relation to each other.

The arrangement of the end faces of the belt is such that when the two ends are butted together, the two faces 118 will contact or abut each other, and the pairs of faces 117, 119 and 120 will diverge from each other. By this construction, when the joint of the belt passes over pulleys or sheaves, the belt will be free to bend or flex, the V-shaped gaps between the angularly disposed faces being closed to some extent during such bending movements.

For the purpose of connecting the two ends of the belt 111 together, suitable means are provided.

Embedded in one end of the belt is a U-shaped member 121 which constitutes a female member of the belt connecting means. This U-shaped member comprises two side legs 122 and a cross piece or bar 123 at one end of the legs.

The cross bar 123 is formed with an opening 124, in which opening is inserted an end of the cable 116. The cable may be secured to the member 121 by any suitable means, such as by solder or welding, so that the member will not become detached from the cable as the result of strains or stresses imposed thereon.

The side legs 122 of the U-shaped member 121 are formed with alined openings 125, and similar alined openings 126 are formed in the body of the belt 111, as shown in Fig. 7.

The arrangement of the U-shaped member 121 in the end of the belt 111 is such that the ends of the side legs 122 terminate at a distance inwardly from the face 118, so as to provide a recess or pocket 127 in the end of the belt.

The other end of the belt carries a male or coupling member 131.

The member 131 preferably has the form of a T, with one leg 132 of the T projecting longitudinally from the end of the belt for insertion within the jaws provided by the two side legs 122 of the U-shaped member 121. The cross bar or other leg 133 of the T-shaped male member 131 has a face abutting the end face 118 of the belt.

An opening 134 is formed in the main body of the T-shaped male member 131, in which opening is inserted the end of the cable 116. The cable may be secured to the male member 131 by any suitable means, such as by solder or welding, so that said member will not become detached from the cable as the result of strains or stresses imposed thereon.

The leg 132 of the T-shaped male member 131 has an opening 135 formed transversely therein for registration with the alined opening 125, 126.

A pin 136 is adapted to be driven through the alined openings 125, 126 and 135 for connecting the female and male members 121 and 131 together in the manner shown in Fig. 7.

Since the female member 121 is set back or inwardly from the end face of the belt, and since the pocket 127 provides a recess for the male member 131, the two ends of the belt can be arranged with the faces 118 butting each other. In such position the male member 131 will be disposed within the pocket 127.

From the foregoing it will be noted that the coupling device of the present invention provides a simple and flexible means for connecting the adjoining ends of a belt together.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Means for connecting the adjoining ends of a belt formed of flexible composition material having a cable embedded longitudinally therein, comprising, in combination, a U-shaped socket member embedded entirely within an end of the belt and having the cross piece thereof connected to the cable in said end of the belt, a rigid coupling member for insertion between the two side legs of said socket member, alined openings formed in the two side legs of said socket member and an opening in said coupling member for registration with the alined openings in the legs of said socket member, a pin mounted in said openings for pivotally connecting the coupling member and socket member, and a flexible cable connecting said coupling member with the other of said adjoining ends of the belt.

2. Means for connecting the adjoining ends of a belt comprising, in combination, a U-shaped socket member embedded in each end of the belt, a coupling having a pair of rigid coupler members adapted to be received in said socket members and an intermediate flexible section, and means for pivotally connecting each of said coupler members to the socket members, respectively.

3. Means for connecting the adjoining ends of a belt formed of flexible composition material comprising, in combination, a U-shaped socket member embedded in each end of the belt, the extremities of the two side legs of each said socket member terminating at a point spaced inwardly from the end of the belt, an opening formed lengthwise in the belt and extending from the space between said socket member legs outwardly to the end of the belt, a coupling member comprising a link and having a portion at each end for insertion between the jaws provided by the two side legs of each said socket member, and means for pivotally connecting each end portion of said coupling member to the socket member in each end respectively of the belt.

4. Means for connecting the adjoining ends of a belt formed of flexible composition material comprising, in combination, a U-shaped socket member embedded in each end of the body of the belt, the extremities of the two side legs of each said U-shaped socket member terminating at a point spaced inwardly from the end of the belt, alined openings formed in the two side legs of each said U-shaped socket member, said alined openings also extending through the body of the belt material to provide an opening transversely through the body of the belt adjacent to each end thereof, a coupling member adapted to connect the socket members of the adjoining ends of the belt, said coupling member comprising a link having a portion at each end thereof for insertion within the jaws provided by the two side legs of each said U-shaped socket member, an opening formed within each said end portion of said coupling member for registration with the alined openings in the legs of said U-shaped members respectively, and a pin mounted in each set of alined openings for connecting the coupling member to the socket members respectively.

5. Means for connecting the ends of a belt formed of flexible composition material having a cable embedded longitudinally therein comprising, in combination a U-shaped socket member embedded in each end of the belt and having its main body portion fastened to the end of the cable, the extremities of the two side legs of each said U-shaped socket member terminating at a point spaced inwardly from the end of the belt, alined openings formed in the two side legs of each said U-shaped socket member, said alined openings also extending through the body of the belt, a coupling member adapted to connect the socket members of the abutting ends of the belt, said coupling member comprising a link having an end portion at each end for insertion within the jaws provided by the two side legs of each said U-shaped socket member, an opening formed within each end portion of said coupling member for registration with the alined openings in the legs of said U-shaped socket members respectively, and a pin mounted in each set of alined openings for connecting the coupling member to the socket members.

6. Means for connecting the ends of a belt having a cable embedded longitudinally therein comprising, in combination, a U-shaped member embedded in each end of the belt and having its main body portion connected to the end of the cable, alined openings formed in the two side legs of each said U-shaped member, said alined openings also extending through the body of the belt to provide an opening transversely through the belt adjacent each end thereof, a coupling member adapted to connect the U-shaped members, said coupling member comprising a link having a rigid headed end portion at each end thereof for insertion within the jaws provided by the two side legs of each said U-shaped member and a flexible portion connecting said end portions, an opening formed in each headed end portion of said coupling member for registration with the alined openings in the legs of said U-shaped members respectively, and a pin driven through each set of alined openings for pivotally connecting the coupling member to the U-shaped members, respectively.

7. Means for connecting the ends of a belt formed of flexible composition material having a cable embedded longitudinally therein, comprising, in combination, a female member embedded in an end of the belt and having its main body portion connected to the end of the cable, a pocket formed in the end of the belt between the female member and the end face of the belt, and a male member connected to the end of the cable at the other end of the belt, said male member having a portion for attachment to said female member and a portion for insertion within said pocket so that the two end faces of the belt can be butted together, and means for connecting the male member to the female member.

8. Means for connecting the adjoining ends of a belt formed of flexible composition material having a cable embedded longitudinally therein, comprising, in combination, a female U-shaped member disposed in an end of the belt and having its main body portion connected to the end of the cable, said female member having a pair of side legs, the extremities of said side legs terminating at a point spaced inwardly from the end of the belt, alined openings formed in the two side legs of said U-shaped female member, said alined openings also extending transversely through the body of the belt to provide an opening through the belt adjacent an end thereof, a male coupling member adapted to connect the ends of the belt together, said male member having its main body portion connected to the end of the cable at the other end of the belt, said male member having the form of a T with one leg projecting longitudinally from the end of the belt for insertion within the jaws provided by the two side legs of said U-shaped female member, the other leg of said T-shaped male member having a face abutting the end face of the belt, an opening formed in the longitudinal leg of said male member for registration with the alined openings in the side legs of said female member, and a pin driven through the alined openings of said male and female members for connecting the two said members together.

9. Means for connecting the ends of a belt formed of flexible composition material having a cable embedded longitudinally therein, comprising, in combination, a female U-shaped member disposed in an end of the belt and having its main body portion connected to the end of said cable, said female member having a pair of spaced side legs terminating at a point spaced inwardly from the end of the belt to provide a pocket in the end of the belt, said pocket extending from the end face of the belt inwardly to the cross piece of said female member which connects the two side legs, alined openings formed in the two side legs of said U-shaped female member, said alined openings also extending transversely through the body of the belt to provide an opening through the body of the belt adjacent an end thereof, a coupling member arranged to connect the ends of the belt together, said coupling member comprising a male member having its main body portion connected to the end of the cable at the other end of the belt, said male member having the form of a T with one leg of the T projecting longitudinally from the end of the belt for insertion within the jaws provided by the two side legs of said U-shaped female member, the other leg of the T having a face abutting the end face of the belt, an opening formed in the longitudinal leg of said male member for registration with the alined openings in the legs of said female member, and a pin driven through the alined openings of said male and female members for connecting the two members together, the other said leg of said T-shaped male member being disposed within the pocket formed in the end of the belt having the female member embedded therein when the two members are pinned together, so that the two adjoining facs of said belt will abut each other.

EUGENE E. BRUNNER.

REFERENCES CITED

The following references are of record in the file of this patent:

UNITED STATES PATENTS

| Number | Name | Date |
|---|---|---|
| 1,466,127 | Gottschalt | Aug. 28, 1923 |
| 1,467,713 | De Voe | Sept. 11, 1923 |
| 2,038,469 | Bannister | Apr. 21, 1936 |
| 2,211,615 | Brickman et al. | Aug. 13, 1940 |

FOREIGN PATENTS

| Number | Country | Date |
|---|---|---|
| 280,185 | Great Britain | May 2, 1928 |